INVENTOR
George S. Schonewald
BY
Pennie, Edmonds, Morton, Barrows & Taylor
ATTORNEYS Nov. 12, 1957  G. S. SCHONEWALD  2,812,663
APPARATUS FOR SAMPLING OR INJECTING FLUIDS
Filed July 20, 1955  3 Sheets-Sheet 2

INVENTOR
George S. Schonewald
BY
ATTORNEYS

Nov. 12, 1957 G. S. SCHONEWALD 2,812,663
APPARATUS FOR SAMPLING OR INJECTING FLUIDS
Filed July 20, 1955 3 Sheets—Sheet 3

INVENTOR
George S. Schonewald
BY
Pennie, Edmonds, Morton, Barrows & Taylor
ATTORNEYS United States Patent Office 2,812,663
Patented Nov. 12, 1957

2,812,663

APPARATUS FOR SAMPLING OR INJECTING FLUIDS

George S. Schonewald, Portland, Maine, assignor to Gilbert & Barker Manufacturing Company, West Springfield, Mass., a corporation of Massachusetts Application July 20, 1955, Serial No. 523,166

7 Claims. (Cl. 73—425.4)

My invention relates to improvements in apparatus for sampling liquids, vapors, gases and pulverized solids which behave as fluids, or for injecting fluids into bodies of other fluids or into chambers or tanks.

Various types of samplers or thief tubes are known for taking samples of oil and other liquids. Conventional samplers are used in the oil industry for taking samples from oil storage tanks, but such samplers, as far as known, do little more than take an average sample of the oil in the tank. Even though the sample is taken at a given level, it is not sealed-off to prevent contamination.

The primary object of my invention is to provide a sampler which will take and retain a reliable sample from any one or more specific levels in a tank and retain such sample free of contamination from the body of fluid in the tank at any other level.

A further object of my invention is to provide an improved sampling apparatus which is automatic in operation and which is adapted to deliver a sealed sample from the desired location.

Another object of my invention is to provide an apparatus which may be used either as a sampler or as an injector adapted to deliver a fluid charge into a body of other fluid.

Another object of my invention is to provide an injector apparatus of wide usage by which a particular chemical such as a dangerous chemical or radioactive material may be delivered into the body of another chemical.

An additional object of my invention is to provide an improved sampling apparatus which may be used to obtain a representative composite sample of the average fluid contents of a tank.

A further object of my invention is to provide improved apparatus for sampling the fluid contents of pipe lines or for injecting fluids into pipe lines.

A further object of my invention is to provide an improved timing means, particularly for apparatus of the type under consideration.

With these and other objects in mind, my improved apparatus comprises a container for holding a sample of fluid as taken or a charge of fluid to be injected, valve means for opening and closing said container, a timing means for controlling the opening and closing of the valve means in a predetermined sequence, and an actuating means operatively associated with the timing means and the valve means for effecting their operation.

In an advantageous construction, the timing means comprises a power spring and a release mechanism therefor the power spring being connected both to the timing means and the valve means for opening and closing the container.

In accordance with the invention the improved timing means comprises a member which is driven by the power means against a confined body of liquid in a chamber, the member being arranged with respect to the chamber holding the liquid in such a manner that the liquid restrains the movement of the member so that it is allowed to move only at a certain preselected rate.

The improved apparatus is adapted to operate in such a manner as a sampler that, after the power means has been cocked and released, it may be lowered to the desired depth in a body of fluid with the sampler closed and therein automatically open the valve of the container after a given time interval, take a sample and reclose the valve to seal-in the sample after a given time interval so that the sample is not contaminated by other fluid when the apparatus is removed.

When the apparatus is operated as an injector, the container is filled with the fluid to be injected, the power means is cocked and the valve closed to retain the fluid, after which the power means is released and the apparatus lowered or delivered to the desired position, whereupon the apparatus automatically opens the valve after a given time interval and releases the fluid to be injected.

The invention includes other features, objects and advantages described more in detail hereinafter in connection with an embodiment of the invention shown in the accompanying drawings forming a part of this application.

Figure 1:
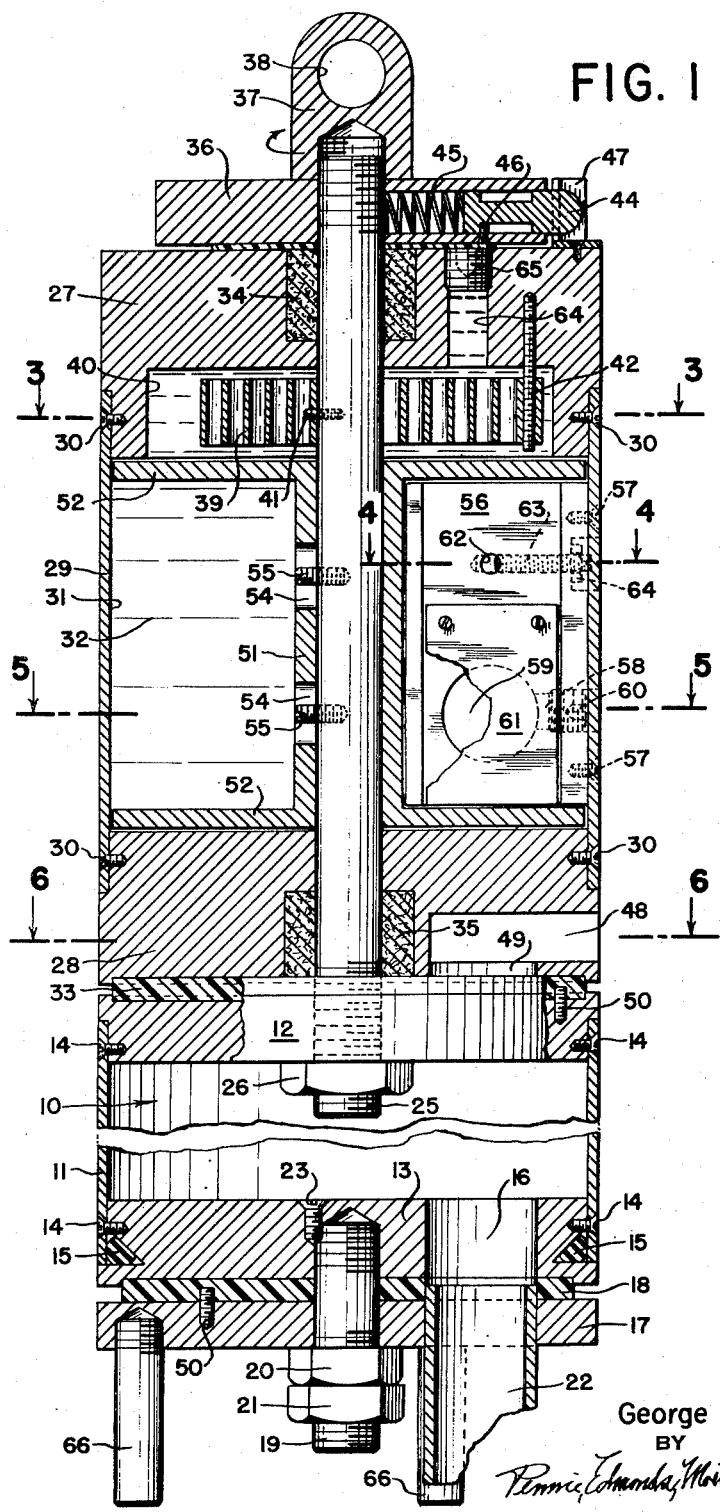
Fig. 1 is a vertical sectional view through an apparatus embodying the features of the invention.

Referring to Fig. 1 of the drawings, the improved apparatus comprises a generally elongated cylindrical structure including a container 10 at the lower end for receiving a sample of fluid or for holding a charge of fluid to be injected. This container includes a cylindrical sheet metal wall 11 secured to upper and lower closure heads 12 and 13, including portions extending into and secured to the wall 11 by means of screws 14. The lower head carries a groove receiving an O-ring gasket seal 15. The bottom head 13 is provided with an off-center round drain port 16, which is manually closed and opened by a rotary valve disc 17 carrying a sealing disc 18 fitting in a recess in the bottom of the head 13. The discs 17 and 18 are held firmly to the head 13 by a shaft 19 threaded into the head 13 and extending axially through the sealing disc 18 and disc 17 and carrying an adjusting nut 20 and a lock nut 21. The disc 17 carries a drain connection 22 extending substantially through the sealing disc 18 and adapted to register with the drain port 16 when the disc 17 is rotated to the correct position. The shaft 19 is locked with respect to the head 13 by means of a screw 23.

The head 12 may be regarded as a valve member as well as a part of the container 10. It is provided with an off-center circular valve inlet port 24 and is threaded to the lower end of a rotatable shaft 25 and locked thereto by a lock nut 26. The shaft 25 extends axially through a fixed assembly, including upper and lower cylindrical blocks or heads 27 and 28 having portions fitting into and secured to the respective ends of a cylindrical casing 29 by means of screws 30. The casing 29, together with the end blocks 27 and 28, defines a chamber 31 filled with a timing liquid 32. This chamber also houses the timing mechanism of the apparatus. The head 12 is sealed with respect to the block 28 by means of a sealing disc 33 set in similar recesses in these elements. The shaft 25 is sealed with respect to the blocks 27 and 28 by means of packing glands 34 and 35.

At the top of the apparatus the shaft 25 is threaded into a cocking disc 36 or latch assembly fitting against the top of the block 27 and rotatable relative thereto, the disc 36 being locked with respect to the shaft 25 by means of a combination lock nut and knob 37 provided with a hole 38 for receiving a chain of the type used for raising and lowering samplers.

The power means for rotating the shaft 25 and container 10 with respect to the fixed assembly comprises a flat coil power spring 39 mounted in a compartment 40 in the underside of the block 27. The inner end of the spring 39 is fixed to the shaft 25 by means of a screw 41, while the outer end of the spring is provided with a loop in the usual manner through which a pin or post 42, threaded in the block 27 extends. The spring 39 is mounted in place under tension and the clockwise rotation of the disc 36 and shaft 25 serves to increase the tension of the spring, so that when released, it rotates the shaft 25, the container 10, the head 12 and the disc 36 in a counterclockwise direction.

Figure 2:
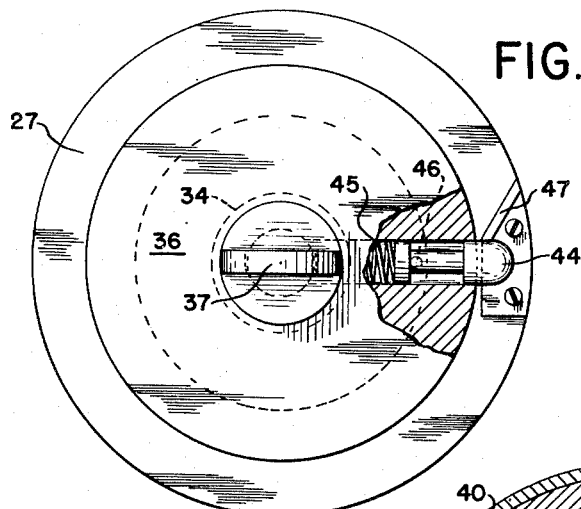
Fig. 2 is a top plan view of the apparatus.
Figure 3:
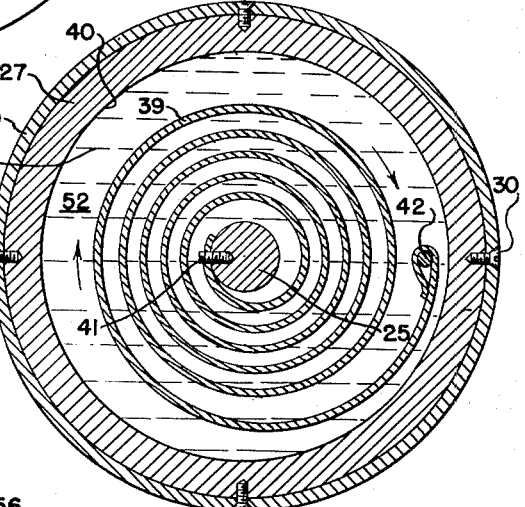
Fig. 3 is a horizontal sectional view taken on the line 3—3 of Fig. 1.

The disc 36 is provided with a latching and starting means including a starting button 44 and a compression spring 45 mounted in a radial bore in the disc 36. The button 44, as shown, comprises an elongated pin having a wide annular recess engaged by a screw 46, which retains the button in place in the disc 36, limits its outward movement and at the same time permits its movement into the bore against the action of the compression spring 45. In Figs. 1 and 2, the latch assembly is shown in its cocked position with the starting button 44 against the edge of a sloping stop plate 47 attached to the top of the block 27.

Figure 6:
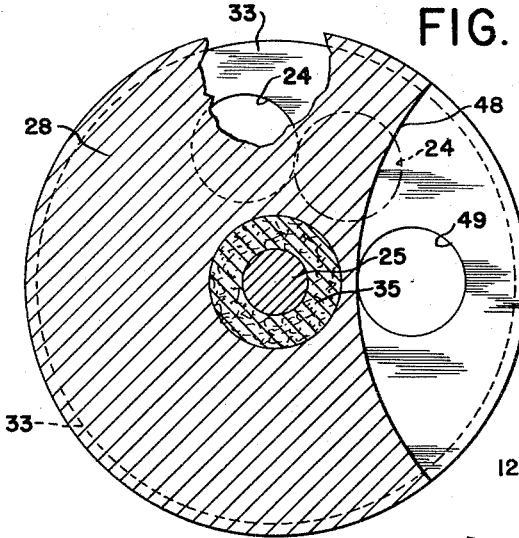
Fig. 6 is a horizontal sectional view taken on the line 6—6 of Fig. 1 showing the structure at the inlet portion of the valve for the container.
Figure 8:
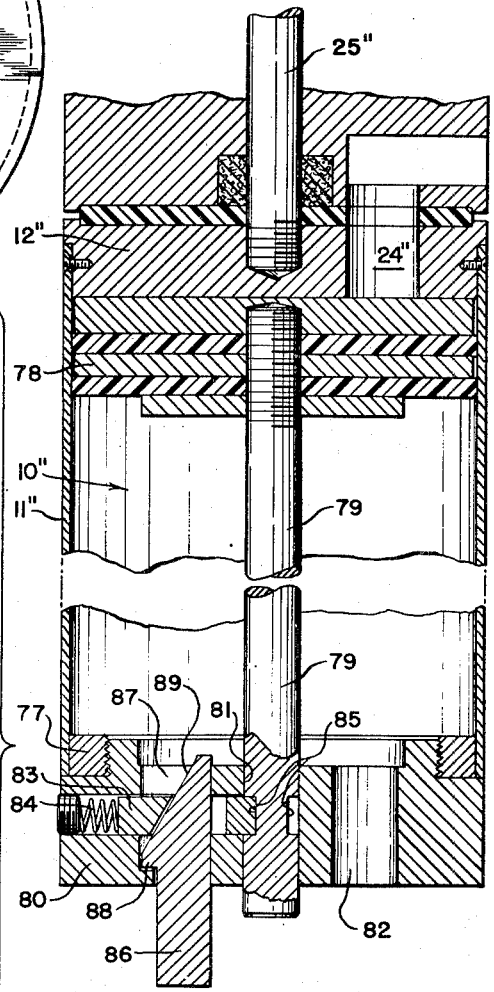
Fig. 8 is a vertical sectional view showing a modified form of container for the apparatus.

The lower portion of the block 28 includes a filling opening adapted to register with the opening 24 when the container 10 is at a particular angular position with respect to the fixed assembly. This opening, as shown in Figs. 1 and 6, comprises an arcuate slot 48 in the side of the block 28 connecting with a circular opening 49 adapted to register with the opening 24. The sealing disc 33 constitutes a seal for the valve member 12. The sealing discs 18 and 33 are preferably made of plastic material such as about ⅛" "Hycar." These discs are respectively held to the members 17 and 12 by means of small screw studs 50, which are threaded in place and the screw heads cut off, after which the sealing discs are pressed onto the studs.

Figure 4:
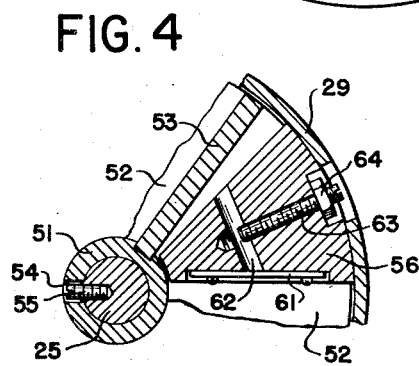
Fig. 4 is a fragmentary horizontal sectional view taken on the line 4—4 of Fig. 1.
Figure 5:
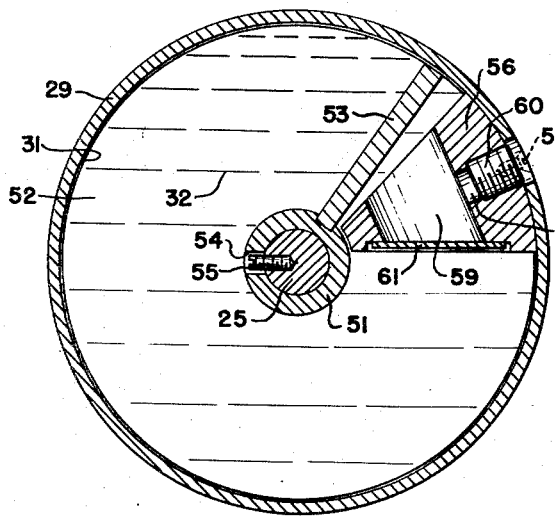
Fig. 5 is a horizontal sectional view taken on the line 5—5 of Fig. 1, showing details of the timing mechanism.

The timing mechanism mounted in the chamber 31, as shown in Figs. 1, 4 and 5 comprises a spool-shaped rotor, including a tubular section 51 fitting around the shaft 25 and carrying integral end discs 52, the tubular section and end discs being slotted with radially-extending slots in which are fitted a rotor blade 53 extending to the periphery of the discs 52. The tubular section 51 of the rotor includes vertical slots 54 receiving screw studs 55 threaded into the shaft 25 for mounting the spool-shaped rotor on the shaft. The slots 54 are provided to permit vertical adjustment of the rotor between the blocks 27 and 28. The rotor blade 53 cooperates with a wedge-shaped segment 56 fixed to the casing 29 by means of screws 57 and fitting the inner surfaces of the tubular section 51 and discs 52 of the rotor. The segment 56, as shown in Figs. 1, 4 and 5, is approximately a 45° segment of a cylindrical block having an inner arcuate surface fitting the exterior surface of the tubular section 51 and an outer arcuate surface fitting and sealed to the interior of the casing 29. Since the segment 56 is fixed with respect to the fixed upper assembly and the rotor is rotatable with the shaft 25, the clearances between the segment and the elements of the rotor are as small as possible, while permitting relatively free rotation of the rotor with respect to the wedge-shaped segment.

The liquid 32, such as a lubricating oil, filling the chamber 31 and the compartment 40 and completely surrounding the rotor and the spring 39 may be introduced through a filling opening 58 extending through the casing 29 and into the segment 56 and connecting with a lateral passageway 59. The opening 58 is closed by means of a screw plug 60. The clockwise end of the passageway 59 is covered by a flexible metal leaf spring 61 mounted in a groove on the clockwise radial face and attached at its upper end to the wedge-shaped segment.

The wedge-shaped segment 56, as shown in Fig. 4, includes a second passageway 62 opening through its radial surfaces. The flow of timing oil through this passageway is controlled by a needle valve 63 or set screw accessible through an opening in the casing 29. The set screw or needle valve 63 may be locked in place by a lock nut 64.

The chamber 31 is completely filled, preferably with a mineral lubricating oil having the desired viscosity characteristics by pouring the oil in through the opening 58. Oil may also be introduced, to insure filling of the compartment 40, through an opening 64 in the block 27 provided with a screw plug 65. Since the rotor operates inside the casing 29 with sufficient clearance to permit rotation, it will be seen that oil completely surrounds the rotor as well as the spring 39.

The elements of the apparatus shown in Figs. 1 to 6 of the drawings may be readily assembled in the following manner.

(1) Fasten the power spring 39 to the shaft 25 and insert the upper end of the shaft into the block 27 and loop the free end of the power spring over the mounting post 42.

(2) Insert the lower end of the shaft 25 through the tubular member 51 of the rotor and secure the screws 55.

(3) Insert the wedge assembly 56 into the rotor between the end discs 52 and slide the tubing or casing 29 over the rotor and wedge and attach the wedge to the casing by securing the screws 57.

(4) Slide the lower block 28 over the lower end of the shaft, apply a small amount of sealing compound to the block 28 and secure the casing 29 to this block by inserting the screws 30.

(5) Wind the power spring by rotating the container 10 clockwise relative to the block 27. In this operation the wedge will engage the blade 53 so that the rotor and shaft will be turned. When the power spring is wound sufficiently, secure the casing 29 to the block 27 by means of the screws 30. The rotor blade 53 will now be against the clockwise face of the wedge or in its final operative position.

(6) Insert the packing glands 34 and 35 and screw the latch assembly disc 36 onto the shaft 25 until the shaft extends above the disc 36 about ⅛".

(7) Insert the valve disc or head 12 with the gasket 33 over the lower end of the shaft 25 and thread it on until the sealing disc is snug against the block 28 and until the opening 24 is about 10° past or counterclockwise of the opening 49. Lock the head 12 to shaft 25 in this position using lock nut 26.

(8) Assemble the elements 13 and 17 and attach the casing 11 to the head 13 using a small amount of sealing compound in the joint.

(9) Fasten the container casing 11 to the head or valve disc 12 again using sealing compound in the joint.

(10) Using the oil fill holes 58 and 64, fill the rotor housing chamber 31 and the compartment 40 with a suitable oil, apply a small amount of sealing compound to the plugs and close the openings 58 and 64.

(11) Adjust the timing to a cycle of approximately 2 minutes 10 seconds. This may be done by screwing the latch assembly disc 36 down against the block 27 until the pressure of the valve sealing disc 33 against the block 28 is sufficient to provide an operating friction which will give the correct time cycle. However, it is preferable to adjust the pressure on the sealing disc 33 to give an adequate seal and then lock the shaft 25 with respect to the disc 36 by means of the lock nut knob 37. The timing cycle is then adjusted by controlling the flow of lubricating oil through the passageway 62 in the wedge 56, since when the latch assembly disc 36 is rotated to a cocked position with the rotor blade 53 on the counterclockwise face of the wedge 56, oil in front of the blade is forced to flow around the wedge 56 and through the passageway 62. The adjustment of flow through the passageway 62 will give the correct timing for the movement of the rotor blade around to the clockwise face of the wedge 56. During the cocking of the operating mechanism, the oil in front of the blade as it is rotated clockwise flows freely through the passageway 59 and opens the flap valve 61.

(12) When the timing has been adjusted, locate the latch stop 47 so as to hold the latch assembly in the cocked position and fasten the stop to the block 27 in this position against the release button 44, by means of the screws shown in Fig. 2.

When the apparatus shown in Figs. 1 to 6 and described above is operated for taking a sample, for example, of oil in an oil tank, the apparatus is carried on a chain by which it is lowered to the bottom or some selected level in the tank. To begin with, the apparatus is cocked by rotating the latch assembly disc 36 clockwise with respect to the body of the apparatus until the button 44 clicks behind the stop 47. Thereafter, the button is released and the apparatus lowered to the selected level within a period of one minute where it is allowed to stay until two minutes plus a few seconds have elapsed after pressing the starting button. The sample is now in the container and sealed off. The apparatus is now pulled up and the valve disc 17 rotated until the outlet 22 is in register with the port 16. The drainage of the sample from the container may be speeded by cocking the device so as to bring the ports 24 and 49 in register.

The apparatus shown in Fig. 1 of the drawings is normally provided with three legs 66 projecting below the bottom of the outlet tube 22 and about an inch in length. These legs are spaced uniformly around the periphery of the disc 17 and threaded thereto. The legs provide a stand for the apparatus when it is lowered into a tank and are used when a sample taken about one foot above the bottom of the tank is satisfactory. However, when it is desired to take a sample close to the bottom of the tank, a leg located on the side of inlet port 24 is removed and a two inch leg screwed in its place. Now when the apparatus is lowered to the bottom of the tank, the two inch leg will tip the apparatus over on its side so that the inlet 48 is closer to the bottom of the tank, that is, when the port 49 is brought into register with the port 24. The long leg must and can be placed under port 24 by rotating disc 17 so that the port 49 will be on top when the sampler is on its side to permit the chamber 10 to fill when port 49 is uncovered.

Figure 7:
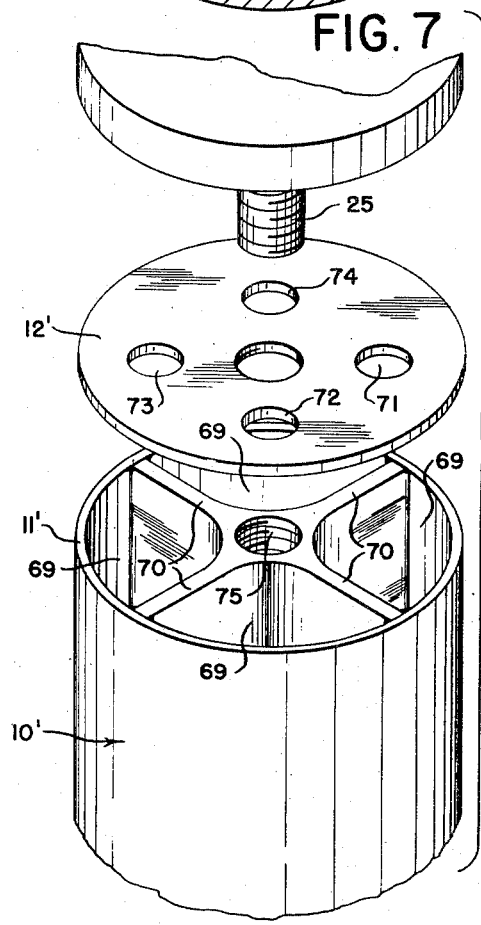
Fig. 7 is a broken perspective view of a compartmented sample container.

The container 10 shown in Fig. 1 of the drawings may be compartmented in the manner shown in Fig. 7 to provide two or more compartments for taking samples in one operation at different levels in a tank, for obtaining a number of samples from various incremental depths from the bottom to the top of the tank, which samples may be blended to obtain a representative average sample of the contents of the tank, or for taking samples at different periods of time from a pipeline. In accordance with the showing in Fig. 7, the container 10' having a shell or casing 11' is divided into a plurality of vertical compartments 69 by means of radially-extending partitions 70 all sealed with respect to each other and to the inside of the casing. The structure of the container 10' is similar to that shown in Fig. 1, but the head or valve disc 12' is provided with inlet ports 71, 72, 73 and 74, respectively for the four compartments 69. In other respects the shell or casing 11' will be attached to the disc 12' in the manner shown in Fig. 1, except that the upper ends of the partition walls 70 will be sealed with respect to the disc 12' so that each sample will be uncontaminated by any other sample.

When the container 10' is used in place of the container 10, however, the shaft 25 may be atttached to the disc 12' in the same manner as that used for the shaft 19 with respect to the head 13. However, after the disc 12' has been threaded onto the shaft 25, the projecting end of the shaft may be threaded into the axial threaded opening 75 until the partitions 70 are brought up into sealing engagement with the bottom of the disc 12' and oriented properly with respect to the ports 71 to 74. The shell or casing 11' is then fastened to the disc 12'.

In the operation of the apparatus provided with the compartmented container shown in Fig. 7, the timing is set so that the compartments are filled in succession at sufficient time intervals to permit movement of the apparatus to a new level or position between compartment filling. After the samples have been taken, they may be removed into separate containers by simply rotating the valve disc 17, so that the outlet 22 is successively brought into register with the outlet ports for the respective compartments.

A sampler employing the compartmented container shown in Fig. 7 may be used to obtain a representative average sample of the fluid contents of a tank. To accomplish this, the sampler, containing a suitable number of compartments, is lowered to the bottom of a tank during the time period elapsing before port 49 comes into register with the first inlet port 71. When a time period equal to the time required for port 49 to begin to uncover the first inlet port 71 expires, the operator slowly raises the sampler from the bottom to the top of the tank either in stages corresponding to incremental fluid depths and the time required to uncover and seal individual compartments or at a slow constant rate, in either case such that not all compartments have been filled when the sampler is withdrawn from the fluid. Fluid is withdrawn from the individual compartments into a common container by slowly rotating valve disc 17 to obtain the sample representing the average tank contents. By the above operation, equal incremental quantities of fluid are sampled from each fluid level within the tank regardless of fluid depth and resulting fluid pressure, whereas if an open, one-compartment vessel were raised from the bottom to the top of a fluid column at a constant rate, greater quantities of fluid would be obtained from the lower levels of the fluid mass where pressures are greater than from the upper levels where pressures are less.

Although it is assumed that a compartmented sampler will be moved straight up in obtaining the average sample of a tank, the sampler may, of course, be moved about at random within a tank by a suitable rigid attachment, for example, to the outside of the fluid mass so as to take a cross-section of the fluid contents of a tank in any pattern.

When used as an injector, the compartmented apparatus may be used to inject fluid into the body of another fluid in any pattern so as to obtain equal dispersion of the one fluid into the body of the other fluid.

When the container shown in Fig. 7 is used for injecting a plurality of different fluids into a body of another fluid, the port 49 is brought into register in succession with the ports 71 to 74, so that the different fluids to be injected are expelled in succession. Any fluid to be injected into another fluid may be charged into the container or the compartments of the container as a mixture containing an aerosol medium, such as one or more of the Freons which are normally gaseous materials liquifiable at low temperatures. If desired, the apparatus may be cocked and charges of cold liquified aerosol mixtures introduced through the pipe 22 as the valve disc 17 is rotated to the outlet ports of the respective compartments 69.

Liquids may also be injected by only partially filling each segmental compartment with the liquid to be injected and by filling the balance of the compartment with an inert gas under pressure by means of a valve like an automobile tire valve beside pipe 22, which pipe 22 would be equipped with a shut-off valve. This arrangement would require that the injector be inverted so that the material to be injected would be next to the injection ports 49 and 48 with the pressurized inert gas above.

Injection of liquids may also be accomplished by loading the segmental chambers against a spring loaded piston, which piston will expand to inject liquid when the respective port is opened. Injection of gases may be accomplished by merely pressuring each segmental chamber with the gas to be injected. The ejection port can be made as a restricting orifice so that the sample container will be emptied gradually over an open-valve time interval. Thus the injection can be dispersed through the surrounding medium by moving the sampler about in the medium during the open-valve time interval.

It is to be understood that the ports 48, 49 and 22 may be provided with threaded or other type connections for coupling the apparatus to other equipment for special purposes. For example, a threaded connection for the port 49 is advantageous when the apparatus is used for taking samples from an oil or gas pipeline. When the apparatus is connected up as a pipeline sampler, it may be used and timed to collect a continuous or composite sample or timed and arranged to collect a plurality of samples at spaced intervals of time.

When the apparatus is used for sampling gas, the container or containers may be evacuated before they are connected up to a gas line or tank or before the apparatus is lowered or otherwise moved into a container or reservoir of gas.

Fig. 8 shows a modified form of container for use with the apparatus, particularly as a continuous or averaging sampler. In this view the container 10'' includes a simple shell 11'' provided with an inwardly-extending threaded bottom ring 77 fixed to the shell. The upper end of the shell 11'' is secured the same as in Fig. 1 to a disc 12'' which is threaded onto the shaft 25'' and locked thereto as by a locking means, such as 23 shown in Fig. 1. In this instance, the shaft does not extend through the disc. This is to permit the plain upper surface of a piston 78, provided with gasket discs, to be pressed up closely against the under surface of the disc 12''. A piston rod 79 is attached to the piston 78 and in commencing a timing and sampling operation, where the apparatus described in Fig. 1 includes the chamber of Fig. 8, the piston 78 is against the valve disc 12'' and held there because of the seal when the port 24'' is closed off.

In order to further maintain the seal of the pistons 78, the bottom of the chamber 10'' is equipped with a bottom assembly block 80 provided with an axial bore 81, through which the piston rod 79 moves freely. The bottom block 80 is threaded onto the ring 77 and is provided with one or more vent holes 82 for the escape of air as the piston 78 moves down in the chamber 10''. The bottom block 80 is also provided with a latch mechanism including a radially-extending slotted latch pin 83, biased toward the piston rod 79 by a spring 84. When the piston 78 is against the disc 12'', the inner end of the latch pin 83 engages in a peripheral slot 85 in the piston rod 79. A trigger rod 86 extends upwardly through a slot 87 in the block 80 and is held in the block by means of a projecting shoulder 88. The trigger 86 includes a sloping surface 89 engaging in the vertical slot in the pin 83 so that upward movement of the trigger rod 86 moves the pin 83 out of engagement with the piston rod 79, thereby releasing the piston 78 so that it may move downwardly in the chamber 10''.

When the sampler, including the chamber 10'', is used for taking an averaging sample in an oil tank, for example, the apparatus is cocked in the usual manner and lowered to the bottom of the tank. When the rod 86 strikes the tank bottom, it releases the piston rod, but the piston remains against the valve disc 12'' held by the vacuum between the valve disc and the piston. After a time interval has elapsed, sufficient to open the port 24'' to the port 49, the operator commences to raise the sampler at a uniform rate and the weight of the piston 78 and piston rod 79 draws in the sample as the apparatus is raised through the body of oil. The stop 47 must be located to stop the valve travel in the fully open position for average sampling but preferably a second removable stop is provided. By raising the sampler at a uniform rate such that it is not quite full when removed from the liquid, an average sample of the liquid is obtained. Because liquid pressure is the same on either side of the piston, the piston will fall at a uniform rate taking in the sample at a uniform rate, regardless of the surrounding pressure which is proportional to the depth of the sampler in the liquid.

Since the chamber 10'' of the averaging sampler is relatively large and initially filled with air, the sampler will doubtless reverse itself to an upside-down position as soon as it is lowered into the liquid. However, the vent opening 82 is relatively large, and preferably two vents are provided so that the air is quickly replaced with liquid. As soon as this happens, the sampler rights itself in the liquid so that the trigger rod 86 will strike the bottom of the tank and release the piston 78. The oil or other liquid beneath the piston will flow out gradually through the vent 82 as the sampler is raised through the body of liquid in the tank. If desired, the vent or vents 82 may be arranged to control the rate of escape of liquid below the piston through the vent or vents 82, to in turn control the rate at which the average sample is collected through the port 24''.

The container shown in Fig. 8 may be used for injecting one fluid into another. For example assuming that the piston 78 is pulled down to the ring 77 and the container filled with a fluid to be injected, the apparatus is then cocked, released and lowered to the bottom of a tank with the piston rod 79 resting on the bottom of the tank. Now as soon as the port 24'' is brought into register with the port 49, the weight of the apparatus will force the piston 78 up into the container and discharge its contents through the ports 24'' and 49.

Fluid may be injected, or ejected from the apparatus by using a simple type of container provided with a spring-biased plunger or piston. For example, the container may be like that shown in Fig. 8 where a coil spring is provided between the ring 77 and the underside of the piston 78. In such a construction the piston 78 is drawn down against the bias of the spring, filled with fluid through the port 24'' and then sealed off by cocking ready for injection into another fluid.

The timing mechanism which controls the time interval between valve opening and closing and the resultant number of sampling or injecting operations per unit of time may be made a function of some external variable factor. As an example, the rate of sampling or injecting of a multiple sampler or injector may be made to vary with pressure or liquid depth by providing a diaphragm linked to the flow control means 63 forcing part 63 in or out to regulate the flow of lubricating oil through passageway 62 to cause the rate of valve opening and closing to increase or decrease in proportion to fluid pressure or depth.

As a second example, the rate of sampling or injecting of a multiple sampler or injector which is attached to a pipeline to sample from or inject into the pipeline may be made to vary directly as the flow of fluid through the pipeline by linking a flow indicating mechanism, such as a propeller within the pipeline, or an orifice plate pressure differential to the flow control means 63 to control the flow of lubricating oil through passageway 62 to in turn regulate the rate of valve opening and closing and resultant sampling or injecting rate in proportion to flow rate through the pipeline. The above flow indicating mechanism could also be made to vary the turning speed of other types of power drives, such as electric motor drives when such drives are used to operate the valve mechanism. As illustrated by this second example, a pipeline could be sampled from or injected into as a function of flow, for instance to take a sample for each 100 gallons, rather than as a function of time, where a sample is taken each ten minutes, for instance.

The sampler shown in the drawings may be made to any desired dimensions but a convenient size is approximately 18½" high overall and about 2¾" in diameter. The container is 2¾" in outside diameter and its shell is 11⅝" high so that it will hold a considerable quantity of material, approximately 1 quart, as a single container and provide adequate samples when divided into four compartments, for example.

While a simple and effective power means has been described and illustrated in connection with the invention, and is preferred, it is to be understood that the power for operating the opening and closing of the sample container ports may be provided by electric motor means, magnetic or electromagnetic means or by pneumatic or hydraulic fluid pressure mechanisms. Furthermore, any of these power means may be arranged to operate with single or multiple chambers and to operate various types of valve arrangements, such as trigger valves, rotating plug cocks, gear or cam-actuated valves or cable-actuated valves.

The sampler of the present invention has many advantages not found in any known type of sampler. It can be operated manually or by means of a winch as when lowered through a vapor conservation gauging hatch. On the other hand, conventional samplers, some of which are provided with a cork to be pulled out, must be lowered manually and jerked to loosen the cork in order to permit the sampler to fill. Furthermore, the sampler of the present invention permits the location of sample levels and the taking of samples precisely and conveniently, and the removal of these samples without contamination with liquid in any other portion in the tank. In the operation of the sampler, the sample is sealed in at the pressure of the sample level. There is, therefore, no loss of volatile material. This feature is particularly advantageous in sampling modern gasolines or other liquids which contain volatile additives.

The improved sampler is easy to operate and there is no danger of opening it prematurely or of breaking the sample chain, since no jerking of the sampler is required to effect its operation.

While a specific construction has been described in considerable detail, it is to be understood that the invention is not limited thereto, except as provided in the appended claims.

I claim:

1. An apparatus of the type described, comprising a fluid-tight cylindrical container for holding fluid, the top of said container being provided with an off-center port for the flow of fluid, a valve member mounted on the upper end of said container in sealing relation thereto and adapted to seal off said port, said valve member including an off-center port adapted to register with the port in the top of the container when the valve member and container are rotated relative to each other to a predetermined position, power means operatively connected with the container and valve member for effecting the relative rotation thereof, said power means being adapted to rotate the valve member and container relative to each other to cause said ports to move into register and then to move out of register, and a timing mechanism operatively connected with the container and valve member for controlling the lapse of time between the starting of the power means and the uncovering of the port in the top of the container.

2. An apparatus as claimed in claim 1, in which the container includes a plurality of compartments and the top of the container includes an off-center port for and communicating with each compartment.

3. An apparatus as claimed in claim 1, including a shaft fixed axially to the top of the container and extending rotatably through said valve member, said power and timing means being operatively connected to said shaft and to said valve member.

4. An apparatus as claimed in claim 1, including a shaft fixed axially to the top of the container and extending rotatably through said valve member, said power means and said timing mechanism being operatively connected to said shaft and to said valve member, said timing means including a chamber surrounding said shaft above said valve member, a hydraulic liquid filling said chamber, and means carried by the shaft movable thereby through the liquid in the chamber.

5. An apparatus as claimed in claim 4, including a dam in said chamber fixed with respect to the side wall thereof and the valve member and extending toward the shaft, whereby a resistance is presented to the rotation of the shaft.

6. An apparatus as claimed in claim 5, including a passageway connecting the opposite sides of the dam in said chamber for the flow of hydraulic liquid, and means for adjusting the rate of flow of hydraulic liquid through said passageway.

7. An apparatus of the type described, comprising a fluid-tight cylindrical container for holding fluid, the top of said container being provided with an off-center port for the flow of fluid, a valve member mounted on the upper end of said container in sealing relation thereto and adapted to seal off said port, a shaft fixed axially to the top of the container and extending rotatably through the valve member, said valve member including an off-center port adapted to register with the port in the top of the container when the valve member and container are rotated relative to each other to a predetermined position, power means operatively connected with the shaft and valve member for effecting the relative rotation between the container and valve member, said power means being adapted to rotate the valve member and container relative to each other to cause said ports to move into register and then to move out of register, a timing mechanism operatively connected with the shaft and valve member for controlling the lapse of time between the starting of the power means and the uncovering of the port in the top of the container, the timing mechanism comprising a cylindrical chamber surrounding said shaft, a rotor in said chamber rotatably fixed with respect to said shaft and including upper and lower discs, a radially-extending vane connecting said discs, a dam carried by said chamber and extending between said discs in overlapping relationship with respect to said vane, and a liquid filling said chamber.

References Cited in the file of this patent

UNITED STATES PATENTS

| | | |
|---|---|---|
| 1,101,568 | Roberts | June 30, 1914 |
| 1,950,854 | Lerch | Mar. 13, 1934 |
| 2,137,128 | Blake | Nov. 15, 1938 |
| 2,147,983 | Lindsly | Feb. 21, 1939 |
| 2,314,372 | Splihaus | Mar. 23, 1943 |
| 2,640,542 | Brown | June 2, 1953 |